United States Patent
Stobbe et al.

(10) Patent No.: US 11,381,966 B2
(45) Date of Patent: Jul. 5, 2022

(54) IDENTIFICATION ADAPTER AND IDENTIFICATION DEVICE

(71) Applicant: Astra Gesellschaft für Asset Management mbH & Co. KG, Barsinghausen (DE)

(72) Inventors: Nicolas Stobbe, Hannover (DE); Anatoli Stobbe, Barsinghausen (DE)

(73) Assignee: ASTRA GESELLSCHAFT FUER ASSET MANAGEMENT MBH & CO. KG, Barsinghausen (DE)

(*) Notice: Subject to any disclaimer, the term of this patent is extended or adjusted under 35 U.S.C. 154(b) by 0 days.

(21) Appl. No.: 16/571,366

(22) Filed: Sep. 16, 2019

(65) Prior Publication Data

US 2020/0092721 A1 Mar. 19, 2020

(30) Foreign Application Priority Data

Sep. 17, 2018 (DE) ...................... 10 2018 122 758.2

(51) Int. Cl.
| | |
|---|---|
| H04W 12/06 | (2021.01) |
| H04W 4/80 | (2018.01) |
| G06K 19/07 | (2006.01) |
| H04W 28/18 | (2009.01) |
| H04W 84/12 | (2009.01) |

(52) U.S. Cl.
CPC ........ *H04W 12/06* (2013.01); *G06K 19/0723* (2013.01); *H04W 4/80* (2018.02); *H04W 28/18* (2013.01); *H04W 84/12* (2013.01)

(58) Field of Classification Search
CPC ....... H04W 4/80; H04W 76/00; H04W 12/00; H04W 12/06; H04W 28/18; H04W 84/12; G06K 19/0723

USPC ........................................... 455/411
See application file for complete search history.

(56) References Cited

U.S. PATENT DOCUMENTS

| | | | |
|---|---|---|---|
| 10,403,063 B2* | 9/2019 | Drako | H04W 4/021 |
| 2004/0041019 A1 | 3/2004 | Schneider et al. | |
| 2007/0174907 A1* | 7/2007 | Davis | G07C 9/28 726/9 |
| 2014/0002236 A1 | 1/2014 | Pineau et al. | |
| 2015/0317624 A1* | 11/2015 | Saunders | G06Q 10/10 705/43 |
| 2017/0124792 A1 | 5/2017 | Schoenfelder et al. | |
| 2017/0364905 A1* | 12/2017 | Hart | H04B 5/0037 |
| 2018/0102006 A1* | 4/2018 | Conlin | G07C 9/23 |
| 2018/0159839 A1* | 6/2018 | Citron | H04L 63/0853 |
| 2020/0112838 A1* | 4/2020 | Fox | G06K 9/00228 |

FOREIGN PATENT DOCUMENTS

| | | |
|---|---|---|
| EP | 3062294 A1 | 8/2016 |
| WO | 2017036714 A1 | 3/2017 |

* cited by examiner

*Primary Examiner* — Charles N Appiah
*Assistant Examiner* — Frank E Donado
(74) *Attorney, Agent, or Firm* — WCF IP

(57) ABSTRACT

An identification adapter for an identification device has a reading unit and a control unit. The control unit is connected to the reading unit via a data communication connection. The identification adapter has a receiving unit for wirelessly receiving identification data (ID). Also, the identification adapter has a data transmission unit designed to transmit the received identification data (ID) to the control unit on the same data communication connection as the reading unit.

10 Claims, 1 Drawing Sheet

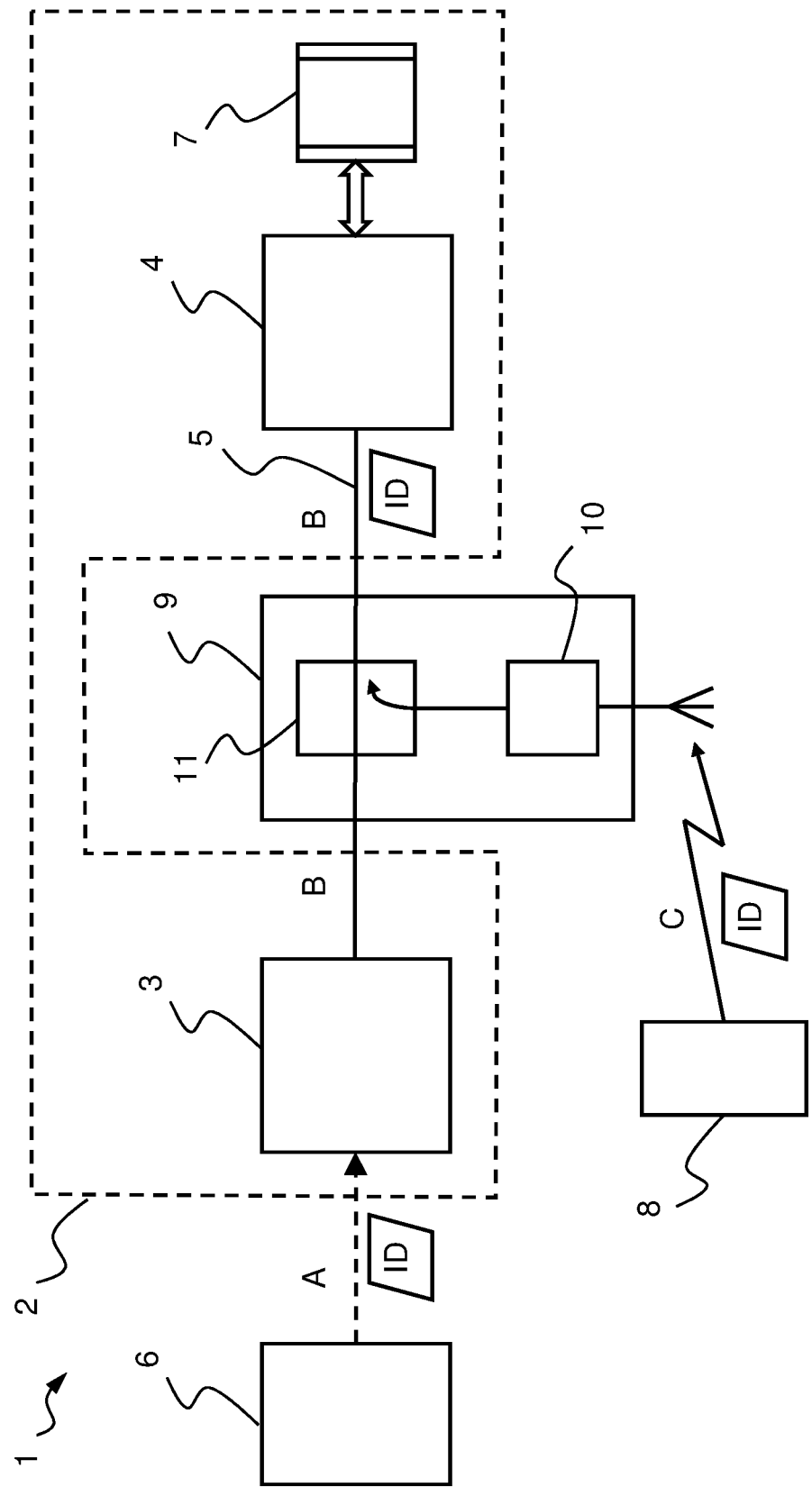

IDENTIFICATION ADAPTER AND IDENTIFICATION DEVICE

FIELD OF THE INVENTION

The invention relates to an identification adapter for an identification device, which has a reading unit and a control unit which is connected to the reading unit via a data communication connection.

The invention also relates to an identification device with a reader and a control unit which is connected to the reading unit via a data communication connection.

BACKGROUND

For access control, time recording, authorization and release control, for example in the management of key cabinets and drawer systems and/or transfer stations, reader devices with an input interface are known, via which a user can be identified by means of identification data. These identification data are then transmitted via a wired data communication connection to a control unit connected to the input unit, where they are verified. As a result, the access control device can unlock, e.g., a door in a building or part of a building, or in the event of an unauthorized access attempt keep the door locked, or detect the time of the beginning and end of a working shift of a person, or open a drawer in a drawer system attachment and release or withhold the object stored therein. The input unit of a reader device is traditionally implemented as a near-field receiver or transceiver for reading out data from a transponder (e.g. RFID) but can also be a keypad for entering a PIN code. The input unit can also be designed, however, to acquire the identification data using biometric sensors, such as fingerprint sensors, iris detectors or similar.

Furthermore, radio locks are known, which wirelessly receive an identification signal, evaluate it and use it for access control.

SUMMARY

The object of the present invention is to create an improved identification device, in which an identification device consisting of a reader and a control unit can be retrofitted for an additional wireless radio identification.

It is proposed that the identification adapter has a receiving unit for wirelessly receiving identification data and a data transmission unit which is connected to the receiving unit and designed to transmit the received identification data to the control unit on the same data communication connection as the reading unit.

In order to retrofit identification devices an additional identification adapter is therefore provided, which is designed for wireless identification with a corresponding receiving unit. This identification adapter is looped on the physical level and/or the logical protocol level into the already existing interface of the control unit, which is already used for the data transfer connection between the reading unit and control unit. The data transfer unit of the identification adapter is thus configured to transmit the identification data, which are received wirelessly on the same interface between the reading unit and control unit, to the control unit. This allows the identification adapter with its data communication connection to be simply inserted into the existing data communication connection between the reading unit and control unit, without modifications needing to be made to the firmware of the existing reading unit or control unit.

Identification data are understood to mean all individualized data used for identification purposes. The identification data need not be uniquely assigned to the person or object which use the detection unit in order to identify this person or this object. Identification data can therefore also be, for example, authentication data that are still suitable for authorization control without identification. In such an authentication, for example, the person or object can be identified as an authorized member of a group. For example, identification data can also be activation codes or other data to be transmitted to the control unit.

Multiple reading units can also be connected to a control unit via a respective data communication connection, in which case an identification adapter is connected into a respective data communication connection of the assigned reading device as an intermediate component. For the purposes of the present invention the indefinite article "a" is therefore to be understood in the sense of "at least one" and not as a numeral.

The reader and the control unit can each be set up remotely from each other and connected to each other via the data communication connection by means of data cables. The identification adapter can then be easily tapped into the cable connection of these two devices, i.e. between the reader and the control unit, by means of plug connections and an additional connection cable. Optionally, it is conceivable for the reader to be accommodated in a dedicated housing separately from the control unit. It is conceivable, but not necessary, that the reader and the control unit can share a higher-level outer enclosure.

The transmission of the received identification data on the same data communication connection as the reading unit to the control unit can be carried out, for example, with a Y-cable that is routed together on the same conduit in the control unit.

It is also conceivable, however, that the data communication connection between the reader and the control unit is looped through the additional data transmission unit of the authentication adapter. To this end, the data transfer unit of the identification adapter can be designed to be connectable to the reader unit and to loop the data from the reading unit through to the control unit. This has the advantage that the identification adapter can be easily intermediately connected into the data communication connection by re-connecting the cable connectors of the data communication connection.

The data communication connection can be a wired, unidirectional serial data transmission interface for one-to-one connection or in the form of a data bus. Such a data communication connection can be implemented in accordance with the Wiegand standard, but also as a two-wire interface/bus according to other protocol standards, such as I2C, RS232 or other serial or parallel interfaces.

The receiving unit can be configured to receive identification data via a coded radio message from a mobile terminal. The mobile terminal in this case is designed for wireless transmission of data and can be, for example, a smartphone, a Bluetooth beacon, a transponder with wide-range RFID technology and the like. It is thus conceivable that a software application is available on a smartphone, which via a manual or automatic activation by the user or another trigger, such as a radio signal, transmits an identification to the receiving unit as a coded radio message with identification data. This software application can also be connected via the mobile wireless network to an access control server, in order to provide an additional release control.

The receiving unit can be configured for an additional radio technology which is different from that of the reader, such as for Bluetooth communication, WLAN communication, Near Field Communication (NFC), low-power Wide Area Network communication (LPWAN), wide-range or near-field RFID communication, or other wide-range wireless technologies. This allows not only smartphones to be used as the mobile terminal, but also e.g. radio keys or transponders with active or passive RFID technology identification adapters as a further option for access control.

The data transmission unit can be configured for converting the first data format of the identification data into the second data format designated for the data communication connection between the reader and the control unit. This may also additionally include the decryption of the wirelessly received identification data and the conversion of the identification number or identification code contained therein into an identification corresponding to the range of numbers recognized by the control unit. The identification adapter can therefore be configured to convert a complex encrypted identification message from a mobile terminal, after being wirelessly received by the receiving unit in the data transmission unit, into an identification pattern specified by the control unit.

To do so, the conversion of the data formats can alternatively or additionally also include a modification of the different transmission protocols.

It is conceivable that the corresponding Wiegand protocol is selected for the second data format. The data transmission unit of the identification adapter is then configured to convert the wirelessly received identification data, if appropriate after decryption, into the Wiegand protocol.

It is also conceivable that the identification adapter is configured for the deletion, addition, selection, conversion (e.g. "mapping"), and/or other modifications of the received identification data. The identification adapter is therefore configured to modify the identification data received by the receiving unit of the identification adapter by deletion, addition, selection, regrouping and/or conversion into a character code range specified by the control unit. This allows, e.g., different number ranges or character systems to be mapped onto the character code range that is used and appropriately specified by the control unit in its interaction with the reader device, without the control unit needing to be adapted to the character code range of the identification data received by the receiving unit. The character code range may have multiple data ranges for different types of information, such as object/system number and user number, which are entered into the data packet to be forwarded to the control unit on the basis of the information contained in the received identification data from the identification adapter according to the specifications of the control unit.

By mapping the data, it is also possible to adapt the number ranges received by the receiving unit to the number ranges specified by the control unit. This means a user can receive the identical user number both for access via the reader as well as via the receiving unit. To avoid duplicate identities, by using additional information the control unit can be informed of the access route, either via the reader or via the receiving unit of the identification adapter, over which the identification data or the data derived therefrom arrived at the control unit. Thus, the access route can be communicated as additional information relating to a user identifier in the character code range of the control unit, by means of an identifier or separate range of numbers. It is conceivable, however, that the identification adapter transmits an additional signal to the control unit when the data that were collected by the receiving unit are identification data or data derived therefrom. It is thus also possible for the control unit to determine whether the identification data were collected by the reader or by the receiving unit of the identification adapter.

It is conceivable that the identification adapter, e.g. by suitable programming, may be configured to perform a prescribed modification of the received identification data, controlled by control information in the received identification data. The change logic which is used to perform an adaptation to the character code range specified by the control unit can thus be encoded in the identification data received by the receiving unit. This allows an adaptation of the identification adapter to the connected control unit to be least partially relocated to the coding of the identification data.

The character code range within the meaning of the present invention can be defined by the structure of a data packet, by number ranges and the like.

DESCRIPTION OF THE DRAWINGS

The invention is described below in further detail by reference to an exemplary embodiment and the enclosed drawing. Shown is:

FIG. 1—block diagram of an access control device with reader, control unit and identification adapter.

DETAILED DESCRIPTION

FIG. 1 shows a block diagram of an access control device 1 with an identification device 2, which has a reading unit 3 and a control unit 4, wherein the reading unit 3 and the control unit 4 are connected to each other via a data communication connection 5. The reading unit 3 is designed to receive a message for the entry, access or user request or for the identification/authentication for time recording, or for some other authorization and/or approval, in a first data format A and to extract the identification data ID contained therein from the message in the data protocol and to transmit them via the data communication connection 5 to the controller 4. This can be carried out in another data transfer protocol B, for example, which is specified for the data communication between the reader unit 3 and the control unit 4 through the bilateral sending and receiving logic.

The reading unit 3 is designed to detect the identification data and for this purpose it can have a simple input keyboard, for example, via which the user enters an Identification PIN. It is also conceivable, however, that the reading unit 3 is equipped with a suitable biometric sensor for the biometric scanning of biometric data, such as a fingerprint or iris scanner. The reading unit 3 can also have a receiving unit for receiving a near-field signal, for example, NFC, of a smart card or an RFID key 6, which is brought into the direct reception-enabled range of several centimeters in close proximity to the reading unit 3.

After receipt of the identification data ID by the control unit 4, a verification of the access authorization is carried out there, for example for an access or user control. To this end, an access rights and associated events can be synchronized with a management software 7, which interacts with the control unit 4. Depending on this validation of the identification data ID, an appropriate event, such as unlocking a door to a controlled room or a spatial area of an object, can then take place. It is also conceivable, however, that the control unit is designed for recording and/or forwarding the identification data together with a time stamp for time recording purposes, without performing an authentication procedure.

It is often desirable to extend such an access control device 2 such that an access control is also allowed via another wireless connection to a mobile device 8, which wirelessly broadcasts a message, for example for an entry request, in a second radio communication protocol C.

To this end, the identification device 1 also has an identification adapter 9 with a receiving unit 10 for wirelessly receiving identification data ID in the second wireless communication protocol C. The receiving unit 10 can be configured, for example, to receive and evaluate an RF signal from a mobile terminal 8, such as a smartphone or a tablet. A wireless data communication in the second wireless communication protocol C suitable for this purpose is, for example, one based on the Bluetooth, WiFi, Zigbee standard or any other wireless communication protocol. It is also conceivable, however, that the receiving unit 10 is configured for near-field communication with an RFID radio frequency key or a smart card, if the reader 3 has no such wireless input interface but only as an input keyboard and/or biometric sensors.

The receiving unit 10 of the identification adapter 9 is connected to a data transmission unit 11. This is configured for converting the identification data ID contained in the access request from the mobile terminal 8 with the second wireless communication protocol C into the data format B of the data communication connection 5 between the reading unit 3 and the control unit 4. These identification data ID are then sent via the same data communication connection 5 to the control unit 4, as are the ID identification data originating from the reading unit 3. To this end the data communication connection, viewed from the control unit 4 to the reading device 3 and the receiving unit 10 of the identification adapter 9, is fanned out in the manner of a Y-switch. The data from both the reading unit 3 and the authentication adapter 9 are merged there in the Y-switch, or the data transmission unit 11 can optionally be designed to ensure that only one of the units, the reading unit 3 or the data transmission unit 11, transmits data on the data communication connection 5 at the same time. The probability of a collision during data transmission is very low, however, and can also be compensated for by multiple transmission in the event of a collision, without the need to coordinate the use of the same data communication connection. In the event of a data collision the control unit 4 can prevent a malfunction. Since a data collision is unlikely, additional measures for collision prevention can be dispensed with. An additional anti-collision logic is nevertheless also possible.

This data communication connection 5 can be looped through, for example, by the data transmission unit 11 of the identification adapter 9, as outlined. In that case the data transfer unit 11 is designed to load the identification data ID of the mobile terminal 8 converted into the first data format B onto the data communication connection 5.

The data communication connection 5 can be, for example, a unidirectional serial data transmission interface, which supports the Wiegand protocol, for example. Other suitable data communication connections are also conceivable, however, such as a two-wire interface or bus, for example according to the I2C standard, a CAN-bus or other serial or parallel interfaces, such as RS232 or USB.

LIST OF REFERENCE NUMERALS 1 identification device
2 access control device
3 reading unit
4 control unit
5 data communication connection
6 RFID key
7 management software
8 mobile terminal
9 identification adapter
10 receiving unit
11 data transmission unit

The invention claimed is:

1. An identification adapter for an identification installation, said identification installation comprising:
   a reading device;
   a control device provided separate from the reading device and connected to the reading device via a wired uni- or bi-directional serial or parallel data communication connection;
   wherein the reading device is configured to receive a message and extract identification data from the message and to transmit the identification data via the wired uni- or bi-directional serial or parallel data communication connection in a second data format to the control device,
   said identification adapter comprising:
   a receiving unit for wirelessly receiving the identification data (ID); and
   a data transmission unit;
   wherein the receiving unit is connected to the data transmission unit;
   wherein the identification adapter is looped into a pre-existing interface of the control device which is used for the data communication connection between the reading device and the control device;
   wherein the data transmission unit is configured for converting a first data format of the identification data (ID) received by the receiving unit into the second data format, the second data format being designated for data communication between the reading device and the control device, including decryption of the wirelessly received identification data (ID) and conversion of an identification number or identification code contained therein into an identification corresponding to a range of numbers recognized by the control device having an identification pattern specified by the control device; and
   wherein the data transmission unit is configured to transmit the identification data (ID) received from the receiving unit to the control device on the same wired uni- or bi-directional serial or parallel data communication connection as the reading device.

2. The identification adapter as claimed in claim 1 wherein the data transmission unit is connectable to the reading device and is configured to loop data from the reading device unit through to the control device.

3. The identification adapter as claimed in claim 1 wherein the receiving unit is configured for receiving the identification data (ID) via a coded radio message from a mobile terminal.

4. The identification adapter as claimed in claim 1 wherein the receiving unit is configured for Bluetooth communication, WLAN communication, NFC, nearfield RFID communication, long-range RFID communication, or for low-power Wide Area Network Communication (LPWAN).

5. The identification adapter as claimed in claim 1 wherein the second format is selected according to Wiegand protocol.

6. The identification adapter as claimed in claim 1 wherein the data transmission unit is configured for modifying the identification data (ID) received by the receiving unit by deletion, addition, selection, regrouping and/or transformation into a character code range specified by the control device.

7. The identification adapter as claimed in claim 6 wherein the second data format is selected according to Wiegand protocol.

8. An identification system, comprising:
a reading device;
a control device provided separate from the reading device and connected to the reading device via a wired uni- or bi-directional serial or parallel data communication connection;
an identification adapter comprising
a receiving unit for wirelessly receiving identification data (ID); and
a data transmission unit;
wherein the reading device is configured to receive a message and extract the identification data from the message and to transmit the identification data via the wired uni- or bi-directional serial or parallel data communication connection in a second data format to the control device;
wherein the identification adapter is looped into a pre-existing interface of the control device which is used for the data communication connection between the reading device and the control device;
wherein the data transmission unit is configured for converting a first data format of the identification data (ID) received by the receiving unit into the second data format, the second data format being designated for data communication between the reading device and the control device, including decryption of the wirelessly received identification data (ID) and conversion of an identification number or identification code contained therein into an identification corresponding to a range of numbers recognized by the control device having an identification pattern specified by the control device; and
wherein the data transmission unit is configured to transmit the identification data (ID) received from the receiving unit to the control device on the same wired uni- or bi-directional serial or parallel data communication connection as the reading device.

9. The identification system as claimed in claim 8, wherein the reading device and the control device are mountable remotely from each other and are connectable to each other via the data communication connection using data cables.

10. The identification system as claimed in claim 8, wherein the identification system is configured for access control, time recording, authorization and/or release control.

* * * * *